(12) United States Patent
Otsubo

(10) Patent No.: US 12,134,241 B2
(45) Date of Patent: Nov. 5, 2024

(54) METHOD FOR PRODUCING LIGHT CONTROL PANEL USED IN OPTICAL IMAGE FORMING DEVICE

(71) Applicant: Asukanet Company, Ltd., Hiroshima (JP)

(72) Inventor: Makoto Otsubo, Hiroshima (JP)

(73) Assignee: ASUKANET COMPANY, LTD., Hiroshima (JP)

( * ) Notice: Subject to any disclaimer, the term of this patent is extended or adjusted under 35 U.S.C. 154(b) by 185 days.

(21) Appl. No.: 17/909,778

(22) PCT Filed: Mar. 3, 2021

(86) PCT No.: PCT/JP2021/008217
§ 371 (c)(1),
(2) Date: Sep. 7, 2022

(87) PCT Pub. No.: WO2021/182246
PCT Pub. Date: Sep. 16, 2021

(65) Prior Publication Data
US 2023/0113203 A1    Apr. 13, 2023

(30) Foreign Application Priority Data
Mar. 10, 2020 (JP) ................................. 2020-040936

(51) Int. Cl.
*B29D 11/00* (2006.01)
*B32B 7/12* (2006.01)
(Continued)

(52) U.S. Cl.
CPC .... *B29D 11/00596* (2013.01); *B29D 11/0073* (2013.01); *B32B 7/12* (2013.01);
(Continued)

(58) Field of Classification Search
CPC .......... G02B 30/35; G02B 5/08; G02B 30/56; G02B 17/006; B32B 38/0004;
(Continued)

(56) References Cited

U.S. PATENT DOCUMENTS

2015/0234099 A1* 8/2015 Otsubo ............... B32B 38/0004
156/250
2015/0336340 A1* 11/2015 Otsubo .................. G02B 30/56
264/1.38

FOREIGN PATENT DOCUMENTS

EP        3118664 A1     1/2017
JP        2007249130 A * 9/2007
(Continued)

OTHER PUBLICATIONS

Notice of Reasons for Refusal dated Jun. 23, 2020, issued in counterpart JP Application No. 2020-040936, with English translation (6 pages).

(Continued)

Primary Examiner — Carson Gross
(74) Attorney, Agent, or Firm — WHDA, LLP

(57) ABSTRACT

This method for producing a light control panel used in an optical image forming device includes: a step of forming a laminate 22 by laminating a plurality of transparent plate materials 20 having the same thickness while alternately shifting them by a predetermined length in the width direction so as to form protruding portions 21; a step of forming light-reflecting layers 13 at least on facing surfaces 16 of the adjacent protruding portions 21; a step of filling gap regions 26 between the adjacent protruding portions 21 with a transparent resin 27; a step of cutting and separating the protruding portions 21 integrated at each side of the laminate 22 from a laminated body 28 thereby making preforms 29, 30 for the light control panels 10, 11; and a step of flattening (Continued)

both end surfaces of each of the preforms 29, 30 in the width direction.

12 Claims, 7 Drawing Sheets

(51) Int. Cl.
- B32B 27/08 (2006.01)
- B32B 37/12 (2006.01)
- B32B 37/14 (2006.01)
- B32B 38/00 (2006.01)
- G02B 5/08 (2006.01)
- G02B 17/00 (2006.01)
- G02B 30/35 (2020.01)

(52) U.S. Cl.
CPC .............. *B32B 27/08* (2013.01); *B32B 37/12* (2013.01); *B32B 37/14* (2013.01); *B32B 38/0004* (2013.01); *B32B 2307/412* (2013.01); *B32B 2307/416* (2013.01); *G02B 5/08* (2013.01); *G02B 17/006* (2013.01); *G02B 30/35* (2020.01); *Y10T 156/1052* (2015.01)

(58) Field of Classification Search
CPC .............. B32B 17/10; B32B 2307/416; B29D 11/00596; B29D 11/0073; G03B 35/18; Y10T 156/1052

See application file for complete search history.

(56) References Cited

FOREIGN PATENT DOCUMENTS

| | | | |
|---|---|---|---|
| JP | 2015-014777 A | | 1/2015 |
| JP | 2015-187065 A | | 10/2015 |
| JP | 2017-134151 A | | 8/2017 |
| JP | 2018-13585 A | | 1/2018 |
| JP | 2018-97311 A | | 6/2018 |
| JP | 2018097311 A | * | 6/2018 |
| JP | 2018128570 A | * | 8/2018 |
| WO | 2009/131128 A1 | | 10/2009 |
| WO | 2015/033645 A1 | | 3/2015 |
| WO | 2019/155647 A1 | | 8/2019 |

OTHER PUBLICATIONS

Notice of Reasons for Refusal dated Oct. 6, 2020, issued in counterpart JP Application No. 2020-040936, with English translation (7 pages).

Decision to Grant a Patent dated Jan. 5, 2021, issued in counterpart JP Application No. 2020-040936, with English translation (5 pages).

International Search Report dated Apr. 27, 2021, issued in counterpart Application No. PCT/JP2021/008217, with English translation (7 pages).

Office Action dated Aug. 1, 2024, issued in counterpart KR Application No. 10-2022-7033188, with English translation. (11 pages).

* cited by examiner

METHOD FOR PRODUCING LIGHT CONTROL PANEL USED IN OPTICAL IMAGE FORMING DEVICE

TECHNICAL FIELD

The present invention is related to a method for producing a light control panel having a large number of light-reflecting layers (i.e., each of the light-reflecting layers is a layer whose front and back surfaces are light-reflecting surfaces or mirror surfaces) arranged in parallel so as to be perpendicular to front and back surfaces of the light control panel, and two of the light control panels are superposed on each other so that the light-reflecting layers of the respective light control panels are orthogonal to each other when viewed from above to form an optical image forming device.

BACKGROUND ART

As a device that forms a stereoscopic image using light (i.e., scattering light) emitted from the surface of an object, for example, there is an optical image forming device using a light control panel described in Patent Document 1. Specifically, a light-entering-side light control panel and a light-exiting-side light control panel each having a large number of belt-like light-reflecting portions arranged side by side at a constant pitch vertically across the thickness direction of a transparent flat plate are disposed so that the light-reflecting portions of the respective light control panels are orthogonal to each other when viewed from above.

The light control panel set forth in Patent Document 1 is produced in a manner where transparent plates (e.g., glass plates) each having a reflective metallic film for forming the light-reflecting portion or reflective metallic films for forming the light-reflecting portions formed on one side or both sides of the plate respectively are laminated through an adhesive agent to form a laminate and the laminate is cut with a short width (e.g., 0.5 to 10 mm).

Moreover, a light control panel set forth in Patent Document 2 is produced by preparing a transparent concave-convex plate material having quadrilateral-cross-sectional grooves each being formed between parallel banks on one surface thereof and forming light-reflecting portions on facing parallel side surfaces of each of the grooves.

Additionally, a light control panel set forth in Patent Document 3 is produced by arranging side by side through an adhesive layer (i.e., an adhesive agent) a plurality of mirror elements whose mirrors are formed by vapor deposition on one surface of a rectangular parallelepiped transparent substrate (i.e., transparent member) made of glass.

Furthermore, a light control panel set forth in Patent Document 4 is produced in a manner where a plurality of laminates each having an adhesive layer (i.e., an allyl ester resin) formed on one surface of a sheet-like transparent base material with metal films on both surfaces and made of an allyl ester resin are laminated so that the surface of one laminate on the adhesive layer side and the surface of another laminate on the non-adhesive layer side are in contact with each other, and a part of the laminated laminates is cut along a surface perpendicular to the transparent base materials.

CITATION LIST

Patent Literature

Patent Document 1: WO 2009/131128
Patent Document 2: WO 2015/033645
Patent Document 3: Japanese Unexamined Patent Application Publication No. 2018-97311
Patent Document 4: Japanese Unexamined Patent Application Publication No. 2018-128570

SUMMARY OF INVENTION

Technical Problem

However, in the light control panel set forth in Patent Document 1, since a large number of transparent rectangular materials provided with the light-reflecting portions are joined together through the adhesive agent, variations in the thickness of the adhesive agent cause variations in distance and in parallelity between the light-reflecting surfaces adjacent to each other, and thus, there is a problem that distortion is likely to occur in the formed images.

Moreover, in the light control panel set forth in Patent Document 2, it was difficult even to form the parallel light-reflecting surfaces. In addition, in the case of making the concave-convex plate material for forming the light control panel by injection molding as described in Patent Document 2, depending on the dimensional accuracy of the molding frames, the accuracy of the perpendicular angle of the facing side surfaces of each of the grooves deteriorates (i.e., the side surface is tilted), which can lead to deterioration of product quality. There is a problem that this tendency becomes prominent especially when making a large-sized concave-convex plate material.

Additionally, in the light control panel set forth in Patent Document 3, since the mirror elements are joined together through the adhesive layer, similar to Patent Document 1 described above, there is a problem that distortion occurs easily in the formed images. Furthermore, since the plurality of mirror elements each having the mirror are disposed side by side through the adhesive layers on one side of the transparent substrate, depending on the difference between the refractive indexes of the transparent substrate and the adhesive layer, there is a problem that distortion is easy to occur in the formed images.

In addition, in the light control panel set forth in Patent Document 4, since the plurality of transparent base materials and the adhesive layers for joining the transparent base materials are both composed of resin, for example, depending on the type of resin, the strength of the product tends to decrease and there is a risk of deformation in use.

The present invention has been made in consideration of the above circumstances, and has as its object to provide a method for producing a light control panel used in an optical image forming device by which the light control panel can be produced with a relatively low cost, and the images formed by the optical image forming device have little distortion.

Solution to Problem

The optical image forming device configured by using the light control panels produced by the method of the present invention is formed by superposing two light control panels each having a number of light-reflecting layers arranged in parallel so as to be perpendicular to front and back surfaces of the light control panel so that the light-reflecting layers of the respective light control panels are orthogonal to each other in a plan view;

in each of the light control panels, transparent glass plate materials each having a thickness of 0.1 to 2 mm and having the light-reflecting layer or the light-reflecting layers formed on one side surface or both side surfaces of the glass plate material in the thickness direction, respectively, and transparent resin plate materials each having the same thickness as the glass plate material are disposed alternately so as to be superposed on each other;

a ratio between refractive indexes of the glass plate material and the resin plate material is in the range of 0.9 to 1.1 (preferably, 0.95 to 1.05; more preferably, 0.98 to 1.02; the same applies to the following aspects of the present invention); and the resin plate material also serves as an adhesive agent for directly joining together the adjacent glass plate materials each provided with the light-reflecting layer or the light-reflecting layers, and the light-reflecting layer is formed of a metal-plating film or a metal-vapor-deposition film.

In order to achieve the above object, according to a first aspect of the present invention, there is provided a method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

a laminate formation step of forming a laminate by laminating a plurality of transparent plate materials having a same thickness and consisting of glass or a hard resin with a high melting point while alternately shifting the transparent plate materials by a predetermined length in a width direction so as to form protruding portions;

a light-reflecting layer formation step of forming the light-reflecting layers at least on facing surfaces of the protruding portions adjacent to each other;

a resin filling step of filling gap regions between the protruding portions adjacent to each other with a transparent resin;

a cutting step of making a plurality of preforms (i.e., semi-finished light control panels, the same applies hereafter) for the light control panels by cutting the protruding portions having been integrated by being filled with the transparent resin at each of both sides of the laminate off and separating the integrated protruding portions from a laminated body; and a flattening step of flattening both end surfaces of each of the preforms in a width direction so as to produce the light control panels, wherein a ratio between refractive indexes of the transparent plate materials and the transparent resin is 0.9 to 1.1.

Although glass or a hard resin with a high melting point may be used as the transparent plate materials as mentioned above, glass is (i.e., glass plate materials are) more suitable to easily provide a high-accuracy product.

Note that a hard resin refers to a resin that can retain its shape in a solid state by itself, except for soft resins (e.g., resins that deform when pressed). Additionally, a resin with a high melting point refers to a resin that has a melting point higher than the melting point of the transparent resin used to fill the gap regions between the adjacent protruding portions. This has the advantage that the resin forming the protruding portions does not melt when filling the gap regions with the transparent resin in a liquid state, (the same applies to the following aspects of the present invention).

In order to achieve the above object, according to a second aspect of the present invention, there is provided a method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

a laminate formation step of forming a laminate by preparing a plurality of pieces each of two types of transparent plate materials having a same thickness and different widths, and each consisting of glass or a hard resin with a high melting point, and by laminating the two types of transparent plate materials alternately with edges of the transparent plate materials aligned on one side in a width direction of the laminate to be formed and with protruding portions formed on another side in the width direction;

a light-reflecting layer formation step of forming the light-reflecting layers at least on facing surfaces of the protruding portions adjacent to each other;

a resin filling step of filling gap regions between the protruding portions adjacent to each other with a transparent resin;

a cutting step of making a preform for the light control panel or a plurality of preforms for the light control panels by cutting the protruding portions having been integrated by being filled with the transparent resin off and separating the integrated protruding portions from a laminated body; and a flattening step of flattening both end surfaces of the preform or each of the preforms in a width direction so as to produce the light control panel or the light control panels, wherein a ratio between refractive indexes of the transparent plate materials and the transparent resin is 0.9 to 1.1.

In order to achieve the above object, according to a third aspect of the present invention, there is provided a method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

a laminate formation step of forming a laminate by laminating a plurality of transparent plate materials having a same thickness, consisting of glass or a hard resin with a high melting point and having the light-reflecting layers formed on an entire area or a partial area of the transparent plate material in advance while alternately shifting the transparent plate materials by a predetermined length in a width direction so as to form protruding portions;

a resin filling step of filling gap regions between the protruding portions adjacent to each other with a transparent resin;

a cutting step of making a plurality of preforms for the light control panels by cutting the protruding portions having been integrated by being filled with the transparent resin at each of both sides of the laminate off and separating the integrated protruding portions from a laminated body; and a flattening step of flattening both end surfaces of each of the preforms in a width direction so as to produce the light control panels, wherein the area for forming the light-reflecting layers in each of the transparent plate materials includes parts to be facing surfaces of the protruding portion, and a ratio between refractive indexes of the transparent plate materials and the transparent resin is 0.9 to 1.1.

In order to achieve the above object, according to a fourth aspect of the present invention, there is provided a method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

a laminate formation step of forming a laminate by preparing a plurality of pieces each of two types of transparent plate materials having a same thickness and different widths, each consisting of glass or a hard resin with a high melting point, and each having the light-reflecting layers formed on an entire area or a partial area of the transparent plate material in advance, and by laminating the two types of transparent plate materials alternately with edges of the transparent plate materials aligned on one side in a width direction of the laminate to be formed and with protruding portions formed on another side in the width direction;

a resin filling step of filling gap regions between the protruding portions adjacent to each other with a transparent resin;

a cutting step of making a preform for the light control panel or a plurality of preforms for the light control panels by cutting the protruding portions having been integrated by being filled with the transparent resin off and separating the integrated protruding portions from a laminated body; and a flattening step of flattening both end surfaces of the preform or each of the preforms in a width direction so as to produce the light control panel or the light control panels, wherein the area for forming the light-reflecting layers in each of the transparent plate materials includes parts to be facing surfaces of the protruding portion, and a ratio between refractive indexes of the transparent plate materials and the transparent resin is 0.9 to 1.1.

In the methods for producing a light control panel according to the first to fourth aspects of the present invention, it is preferred that the cutting step include a process of making tip positions of the protruding portions flush with one another by cutting tips of the protruding portions having been integrated by being filled with the transparent resin.

In the methods for producing a light control panel according to the first to fourth aspects of the present invention, it is preferred that the cutting step include a process of making a plurality of the preforms by sequentially cutting the integrated protruding portions from a tip-side to a root-side thereof.

In the methods for producing a light control panel according to the first to fourth aspects of the present invention, although it is preferred that in the laminate formation step, the plurality of transparent plate materials be joined together through an adhesive agent, the plurality of laminated transparent plate materials can also retain the laminated state with no use of such an adhesive agent but with physical pressing force.

In addition, it is preferred that the adhesive agent be placed within a laminating area of each of the transparent plate materials forming the laminate excluding both side end parts in a width direction of the laminating area. This prevents the protruding portions from being tainted by the adhesive agent, and thus, each of the light-reflecting layers can be prevented from tilting. Incidentally, the adhesive agent may be an OCA tape.

Advantageous Effects of Invention

Each of the two light control panels produced with the method disclosed by the present invention and used in an optical image forming device is formed by disposing transparent glass plate materials and transparent resin plate materials alternately so as to be superposed on each other, the glass plate material and the resin plate material have the same thickness, and the ratio between the refractive indexes of the glass plate material and the resin plate material is 0.9 to 1.1. Then, the resin plate material also serves as an adhesive agent directly joining together the glass plate materials adjacent to each other. Therefore, there is no need of an adhesive agent for joining the glass plate material and the resin plate material.

Accordingly, the tilt of the light-reflecting layer caused by the adhesive agent does not occur, thereby making it possible to form an image without distortion.

In the methods for producing a light control panel according to the first to fourth aspects of the present invention, since the plurality of transparent plate materials having a same thickness and consisting of glass or a hard resin with a high melting point (the transparent plate materials also include the two types of transparent plate materials having different widths; the same applies hereinafter) are laminated with the protruding portions formed on one side or both sides of the laminate in the width direction, the parallelism of the protruding portions formed by the transparent plate materials adjacent to each other can be maintained. Here, since the transparent plate materials to be laminated have the same thickness, the distance between adjacent protruding portions is precisely the same as the thickness of each protruding portion. Then, since the gap regions between the protruding portions on which the light-reflecting layers are formed are filled with the transparent resin, the preform for the light control panel can be made with no use of an adhesive agent.

DESCRIPTION OF EMBODIMENTS

Subsequently, with reference to the accompanying drawings, descriptions will be given on embodiments of the present invention for a better understanding of the present invention.

First, an optical image forming device 12 using light control panels 10 and 11 produced with a method for producing a light control panel according to an embodiment of the present invention illustrated in FIGS. 1, 2(A), and 2(B) will be explained while referencing to FIGS. 3(A) and 3(B).

The optical image forming device 12 includes the paired first and second light control panels (also referred to as "parallel light-reflecting panels") 10 and 11, each of which is in a square shape (a rectangular, regular polygonal [with an even number of edges], circular, or elliptic shape is also acceptable) when viewed from above. Since the fundamental shapes of the first and second light control panels 10 and 11 are the same, the same number will be assigned to components in common. Note that the first light control panel 10 is disposed on the lower side (i.e., the light-entering side) and the second light control panel 11 is disposed on the upper side (i.e., the light-exiting side) in FIGS. 3(A) and 3(B).

Figure 3:
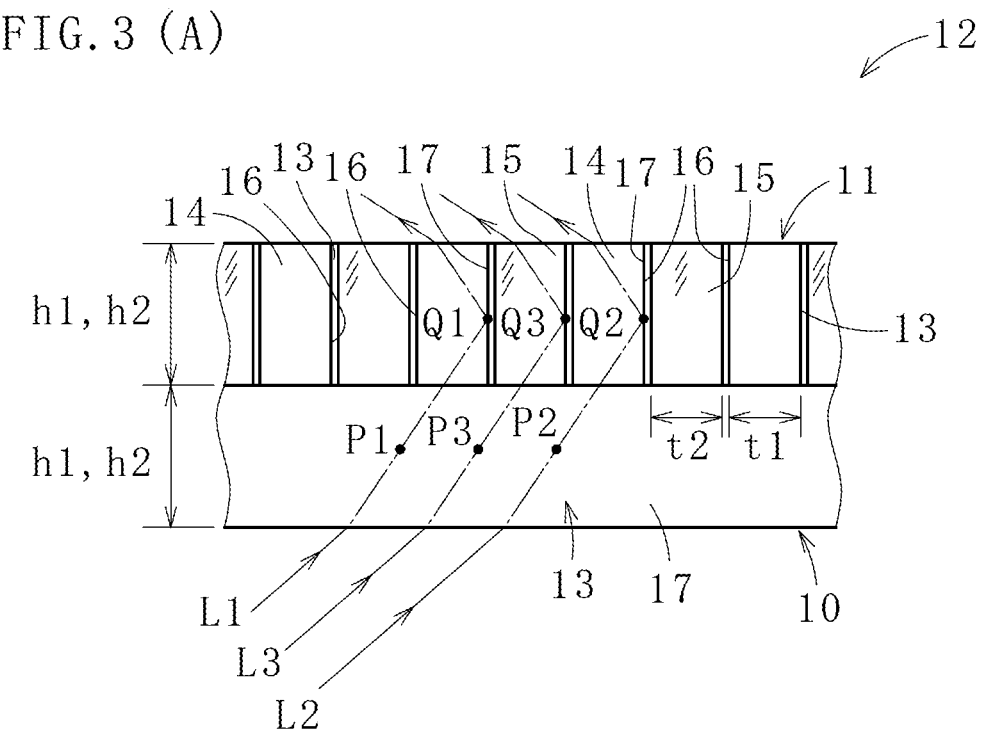
FIGS. 3(A) and 3(B) are an enlarged cross-sectional front view and an enlarged cross-sectional side view of the same light control panel, respectively.
Figure 3:
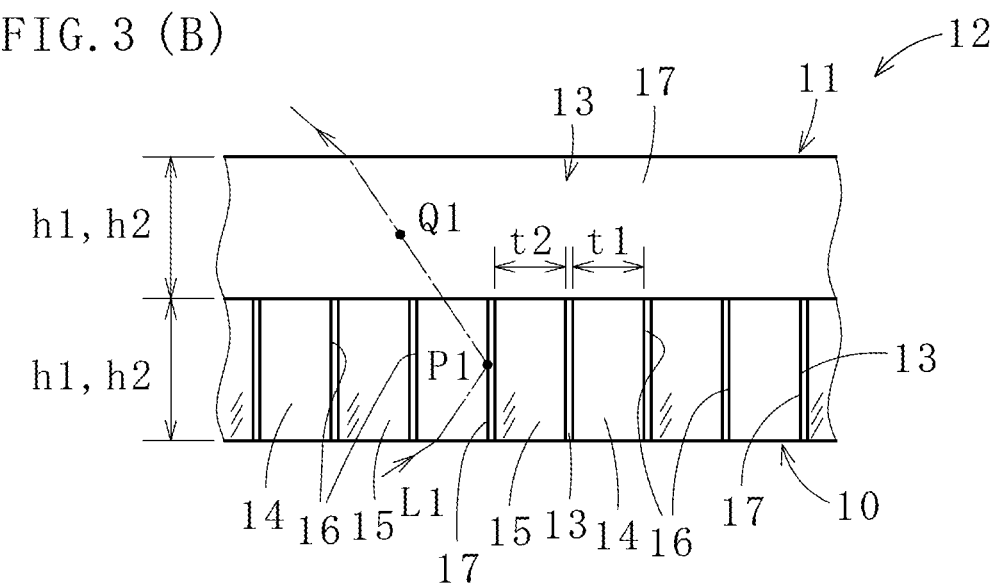

As illustrated in FIGS. 3(A) and 3(B), the first light control panel 10 (the same applies to the second light control panel 11) is provided with a large number of belt-like light-reflecting layers (i.e., perpendicular light-reflecting layers; mirrors) 13 arranged in parallel with gaps so as to be perpendicular to the both surfaces (i.e., the front and back surfaces) of the first light control panel 10.

Specifically, each of the first and second light control panels 10 and 11 is configured by disposing transparent glass plate materials 14 each having a right-angle-quadrilateral cross-section and having the light-reflecting layers 13 formed on both side surfaces thereof in the thickness direction, and transparent resin plate materials 15 each having the same thickness as the glass plate material 14 alternately so as to be superposed on each other. In more detail, the light-reflecting layer 13 is formed on each of facing surfaces 16 of the glass plate materials 14 adjacent to each other (i.e., the both side surfaces of each glass plate material 14 in the thickness direction), and the adjacent glass plate materials 14 with the resin plate material 15 in between are joined together through the light-reflecting layers 13 only by resin of the resin plate material 15 (i.e., the resin plate material 14 not only has a function of transmitting light, but also functions as an adhesive agent that directly joins the adjacent glass plate materials 14 having the light-reflecting layers 13).

The first and second light control panels 10 and 11 compose the optical image forming device 12 by being laminated, joined together, and integrated in a manner where a large number of the light-reflecting layers 13 arranged in parallel so as to be perpendicular to the front and back surfaces of the respective light control panels 10 and 11 are disposed to be orthogonal to each other (including the state where the light-reflecting layers 13 of the first and second light control panels 10 and 11 cross at an angle within, e.g., 85 to 95 degrees; preferably, 88 to 92 degrees) when viewed from above. Although each of the first and second light control panels 10 and 11 is a large-sized one having a side length of, for example, approximately 400 to 2000 mm (the lower limit is preferably 750 mm, more preferably 1000 mm; the upper limit is preferably 1800 mm) in a plan view, the size is not particularly limited.

In between the laminated first and second light control panels 10 and 11, a transparent adhesive agent (e.g., a UV curable resin, a two-component curable resin, a thermosetting resin, a room-temperature curing resin) that is not illustrated is placed. Although FIGS. 3(A) and 3(B) illustrate the state in which the first light control panel 10 and the second light control panel 11 are disposed so that the top surface of the first light control panel 10 and the bottom surface of the second light control panel 11 are in contact with each other (i.e., there is no gap: 0 mm between them), the state in which they are disposed to be close to each other with a gap (e.g., a gap of approximately larger than 0 and 5 mm or less) between them is also acceptable. In this case, this gap is also filled with an adhesive agent (i.e., the distance of the gap is the thickness of the layer of the adhesive agent).

As a synthetic resin constituting the above-mentioned resin plate materials 15 and the adhesive agent, it is preferable to use one having a refractive index that is the same as or close to the refractive index of the glass plate materials 14 (transparent plate materials 20 to be described below). Specifically, a synthetic resin having a refractive index $\eta 2$ that is the same or substantially the same as a refractive index $\eta 1$ of the glass plate materials 14 (e.g., $\eta 2$ is in the range of $[0.9$ to $1.1] \times \eta 1$, preferably, in the range of $[0.95$ to $1.05] \times \eta 1$ more preferably, in the range of $[0.98$ to $1.02] \times \eta 1$) may be used (the same applies to the other embodiments to be described below).

For matching the refractive index $\eta 2$ of the synthetic resin with the refractive index $\eta 1$ of the glass plate materials 14 composing the first and second light control panels 10 and 11, there is a way in which, for example, two or more different kinds of resins are mixed to adjust the refractive index. In this case, it is preferred that the numerical values of the refractive indexes of the glass plate materials and the synthetic resin match from the top to the third digit (i.e., up to the second decimal place).

Note that the synthetic resin mentioned above is preferred to be any one of an ultra-violet curable resin ((meth)acrylate such as urethane (meth)acrylate, (meth)acrylate having a polyisoprene skeleton, (meth)acrylate having a polybutadiene skeleton, and (meth)acrylate monomer), a thermosetting resin, a two-component curable resin, and a room-temperature curable resin. Additionally, a thermoplastic resin such as polymethyl methacrylate (PMMA: an acrylic resin), amorphous fluoropolymer, cycloolefin polymer (COP), optical polycarbonate, fluorinated polyester, and polyethersulfone may be used.

The light-reflecting layer 13 is a metallic film (i.e., a metal coating) formed by mirror-finishing treatment onto each of the facing surfaces 16 of the glass plate material 14, and the front-side and back-side surfaces of the metallic film (i.e., light-reflecting layer 13) become light-reflecting surfaces 17.

In the first and second light control panels 10 and 11, since the light-reflecting layers 13 are formed on the facing surfaces 16 of each of the glass plate materials 14, assuming that the heights of the glass plate material 14 and the resin plate material 15 are h1 and the height of the light-reflecting layer 13 is h2, the height h1 is equal to the height h2 (hereinafter, the both h1 and h2 will be simply referred to as h). Although it is suitable in practice that the height h is, for example, in the range of 0.2 to 10 mm (the lower limit is preferably 0.5 mm, more preferably 1 mm; the upper limit is preferably 5 mm, more preferably 3 mm, much more preferably 2.5 mm), the present invention is not limited by these numerical values.

Additionally, the thickness t1 of the glass plate material 14 and the thickness t2 of the resin plate material 15 are the same. Then, it is suitable in practice that the thickness t1 and the thickness t2 are, for example, in the range of 0.1 to 2 mm (preferably, the lower limit is 0.3 mm and the upper limit is 1.5 mm), and the length of the glass plate material 14 in the longitudinal direction is in the range of 400 to 2000 mm (the lower limit is preferably 750 mm, more preferably 1000 mm; the upper limit is preferably 1800 mm). However, the present invention is not limited by these numerical values.

Note that "the thickness t1 of the glass plate material 14 and the thickness t2 of the resin plate material 15 are the same" does not only refer to a case where the thickness t1 and the thickness t2 are exactly the same but also includes a case where the thickness t2 of the resin plate material 15 is thinner than the thickness t1 of the glass plate material 14 by the thickness of the light-reflecting layer 13 (e.g., 60 nm or more, preferably 80 nm or more [e.g., approximately 100 nm; the upper limit is approximately 150 nm]) by the method for producing a light control panel to be mentioned below. Incidentally, for the explanation convenience, the thickness of the light-reflecting layer 13 drawn in the figures is exaggerated.

Here, an aspect ratio (h/p), which is the ratio of the height h (corresponding to the heights h1 of the glass plate material 14 and the resin plate material 15 or the height h2 of the light-reflecting layer 13) to the pitch p (approximately equal to the thickness t1 of the glass plate material 14 or the thickness t2 of the resin plate material 15) of the light-reflecting layers 13 (i.e., light-reflecting surfaces 17), is preferably in the range of 0.8 to 5 (the lower limit is more preferably 1.5 and much more preferably 2, the upper limit is more preferably 4 and much more preferably 3.5). By having such an aspect ratio, light-reflecting layers 13 each having a higher height can be obtained.

Incidentally, although the light-reflecting layers 13 are formed on the facing surfaces 16 on both sides in the thickness direction (i.e., on both surfaces in the thickness direction) of each of the glass plate materials 14, the light-reflecting layer 13 (i.e., light-reflecting surfaces 17) may be formed on only one of the facing surfaces 16 located on both sides in the thickness direction (i.e., on only one side surface in the thickness direction) of each of the glass plate materials 14, for example, in a case where each glass plate material 14 is thin, or depending on the required product quality.

To obtain a high-definition image by using the optical image forming device 12, Abbe number and smoothness are also important characteristics.

Abbe number is a numerical value indicating the wavelength dependence property of the refractive index, and when the Abbe numbers of the glass plate material 14 and the resin plate material 15 through which light is transmitted are too low, the formed image may be blurred. Therefore, the Abbe numbers of the glass plate material 14 and the resin plate material 15 should be 40 or more, preferably 50 or more, and more preferably 55 or more.

Smoothness is especially important for the face (i.e., the surface of the glass plate material 14) on which the light-reflecting layer 13 is formed, and if the smoothness is too low, the formed image will appear blurry and may spoil the texture. Therefore, the smoothness should be 50 nm or less, preferably 20 nm or less, more preferably 10 nm or less, and particularly preferably 5 nm or less (furthermore, 2 nm or less) when it is described by using the arithmetic average roughness "Ra".

In addition, from the perspective of reduction in weight, it is preferred that the specific gravity of the glass plate material 14 and the specific gravity of the resin plate material 15 be lower.

In FIGS. 3(A) and 3(B), light rays L1, L2, and L3 that are emitted from an object and obliquely enter the optical image forming device 12 from the lower-left side are reflected at P1, P2, and P3 of the light-reflecting surfaces 17 of the first light control panel 10 disposed on the lower side, respectively, furthermore, reflected at Q1, Q2, and Q3 of the light-reflecting surfaces 17 of the second light control panel 11 disposed on the upper side, respectively, and form a stereoscopic image above the optical image forming device 12.

In the optical image forming device 12, as described above, the first light control panel 10 and the second light control panel 11 are disposed so that the light-reflecting surfaces 17 of the first light control panel 10 and the light-reflecting surfaces 17 of the second light control panel 11 are in contact with each other (close to each other). As a result, the degree of light concentration from the object is improved, and a clearer image can be obtained.

Note that the light rays entering sides of the light-reflecting layers 13 formed on the facing surfaces 16 of the respective glass plate materials 14 are used as the light-reflecting surfaces 17 of the first and second light control panels 10 and 11. In FIGS. 3(A) and 3(B), since the light rays enter from the left side, the left-side surface of each of the light-reflecting layers 13 is used as the light-reflecting surface 17. In a case where the light rays enter from the right side, the right-side surface of each of the light-reflecting layers 13 is used as the light-reflecting surface 17.

In the operation of the optical image forming device 12, when light rays enter the glass plate materials 14 and the resin plate materials 15 from the air and when light rays exit from the glass plate materials 14 and the resin plate materials 15 into the air, the refraction phenomenon of light or, in some cases, the total reflection phenomenon of light occurs. Therefore, it is necessary to use the optical image forming device 12 in consideration of these phenomena. Incidentally, the portions other than the light-reflecting surfaces 17 are light passing surfaces.

Subsequently, the method for producing a light control panel according to the embodiment of the present invention will be explained referencing FIGS. 1, 2(A), and 2(B).

Figure 1:
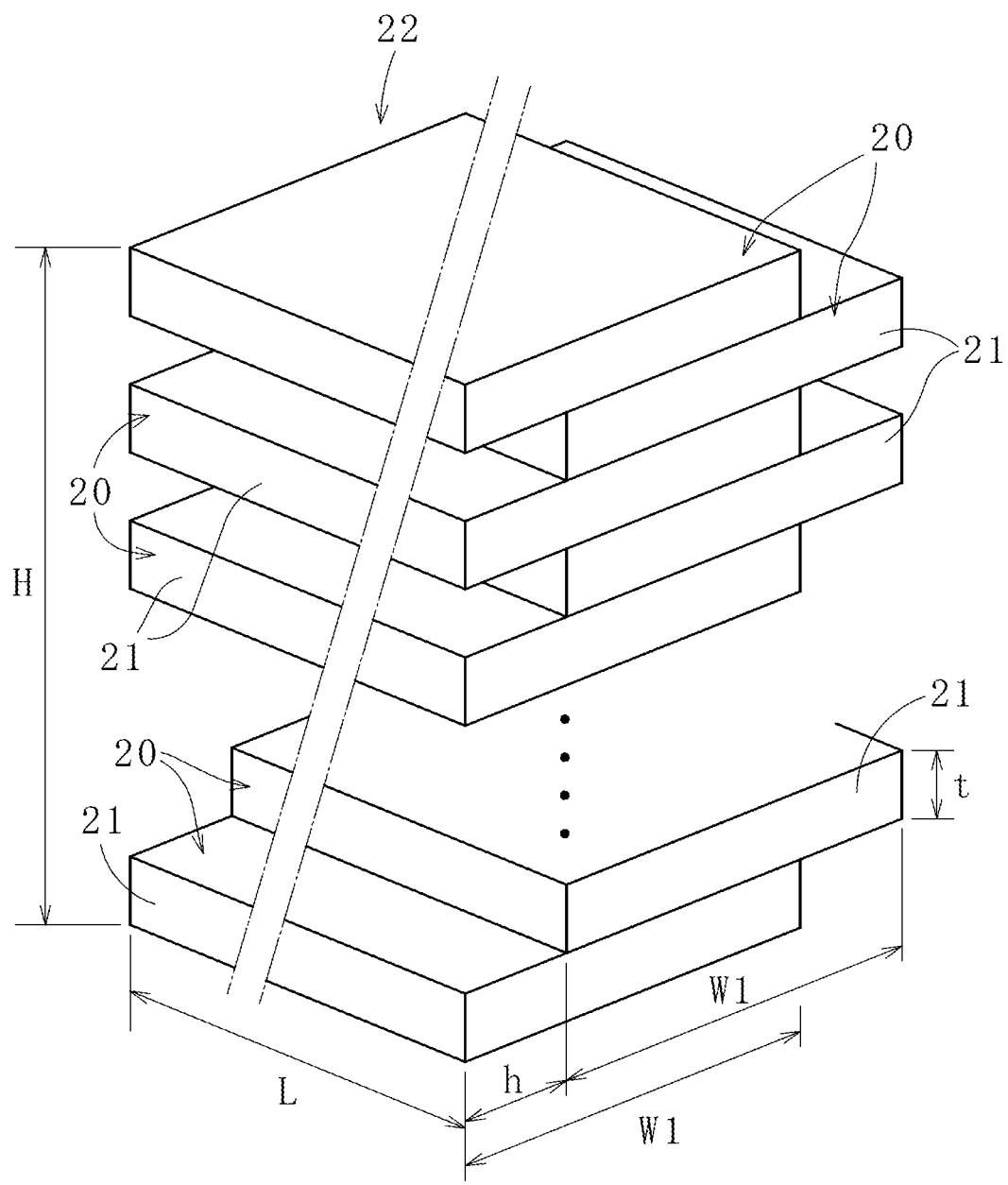
FIG. 1 is an explanatory drawing of a laminate formation step in a method for producing a light control panel according to an embodiment of the present invention.
Figure 2:
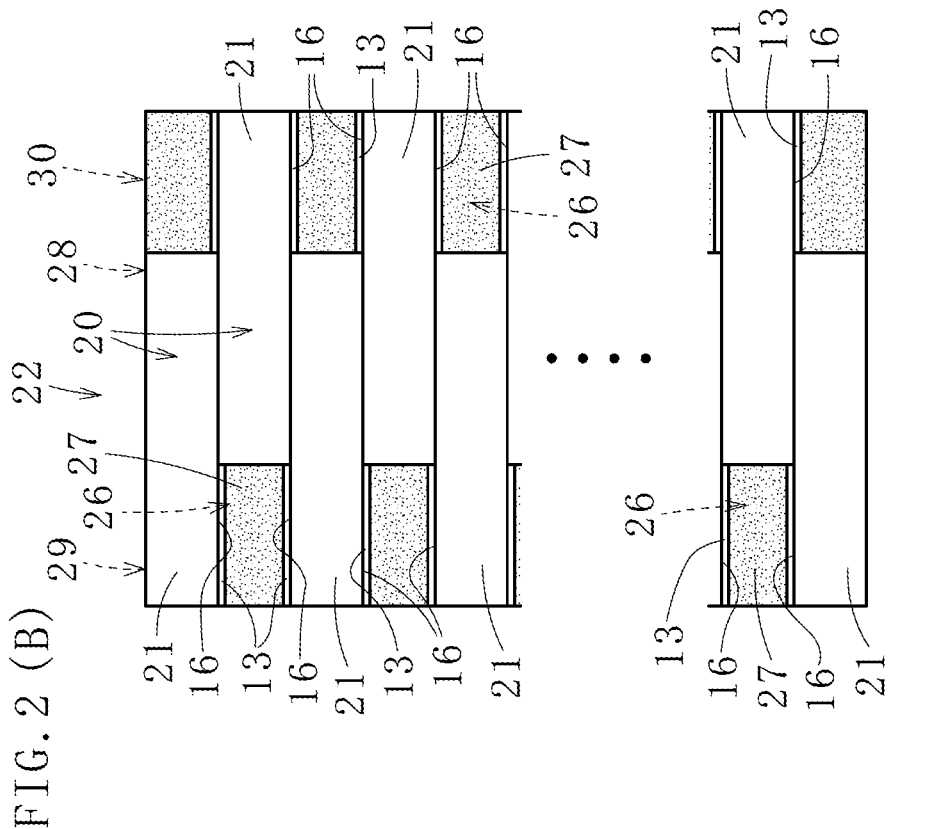
FIGS. 2(A) and 2(B) are a side view and a front view of a laminate having undergone a resin filling step in the same method for producing a light control panel, respectively.
Figure 2:
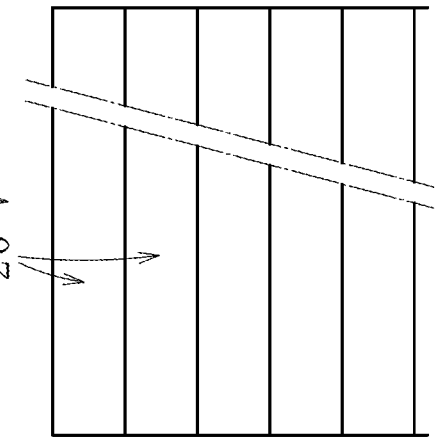

The method for producing a light control panel illustrated in FIGS. 1, 2(A), and 2(B) includes a laminate formation step, a light-reflecting layer formation step, a resin filling step, a cutting step, a flattening step, and an assembling step, and according to this method, the light control panel can be produced at a relatively low cost and an image with less distortion can be formed. It will be described in detail below.

(The Laminate Formation Step)

As illustrated in FIG. 1, a laminate 22 is formed by laminating a plurality of transparent plate materials 20 having a same thickness and each made of glass having a right-angled quadrilateral (i.e., rectangular) shape with short width and long length when viewed from above, in a manner where the transparent plate materials 20 are alternately shifted by a predetermined length in the width direction so as to form protruding portions 21.

The transparent plate materials 20 composing the laminate 22 are laminated so that the height H of the laminate 22 in the laminating direction is, for example, approximately 400 to 2000 mm (the lower limit is preferably 750 mm, more preferably 1000 mm; the upper limit is preferably 1800 mm), but the number of the transparent plate materials 20 to be laminated is not particularly limited.

Regarding the dimensions of the transparent plate material 20, it is suitable in practice that, for example, the width W1 is in the range of 8 to 40 mm (preferably, the lower limit is 20 mm), the longitudinal length L is in the range of 400 to 2000 mm (the lower limit is preferably 750 mm, more preferably 1000 mm; the upper limit is preferably 1800 mm), the thickness t (corresponding to the thickness t1 of the glass plate material 14) is in the range of 0.1 to 2 mm (preferably, the lower limit is 0.3 mm and the upper limit is 1.5 mm) and the protruding length h of the protruding portion 21 (corresponding to the height h1 of the glass plate material 14) is, for example, in the range of 0.2 to 10 mm (the lower limit is preferably 0.5 mm; the upper limit is preferably 5 mm, more preferably 3 mm). However, the present invention is not limited by these numerical values (the transparent plate material may be in a square shape when viewed from above).

Figure 4:
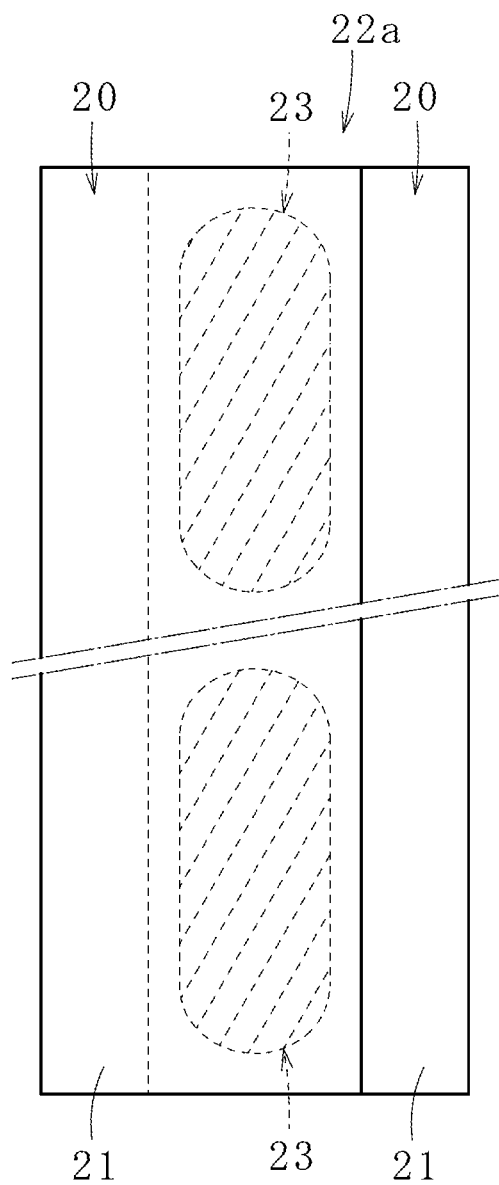
FIGS. 4(A) and 4(B) are a plan view of a laminate having undergone a laminate formation step according to a first modification and a plan view of a laminate having undergone a laminate formation step according to a second modification, respectively.
Figure 4:
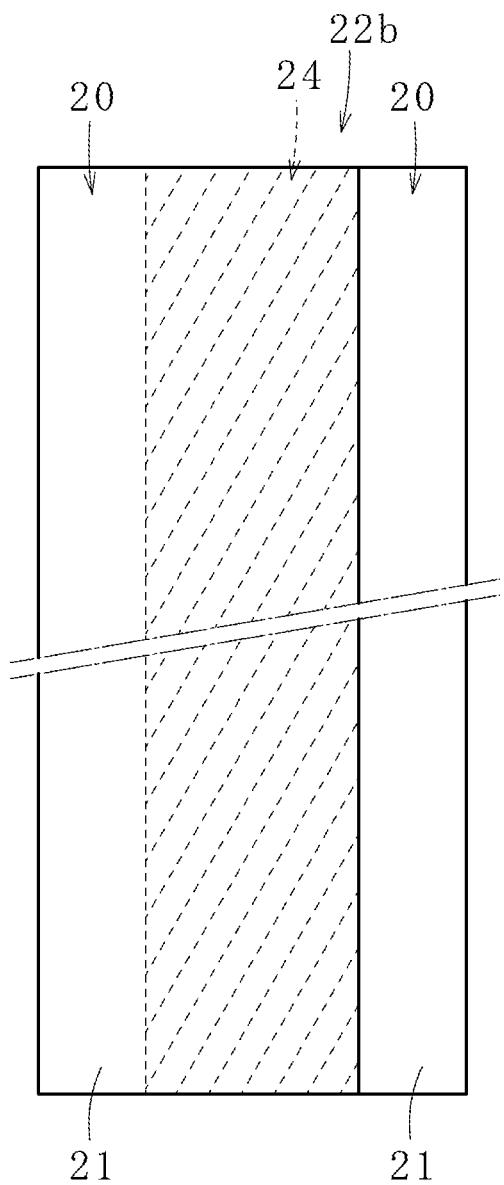

A physical pressing force is applied to the laminate 22 in the laminating direction (i.e., in the thickness direction of the transparent plate material 20) (e.g., the laminate 22 is pressed by using a pressing means) so that the above-mentioned laminated state can be maintained. However, the plurality of transparent plate materials 20 may be joined together, for example, through a synthetic resin (an example of an adhesive agent) 23 (the same resin as the above-mentioned synthetic resin) as in a laminate 22a illustrated in FIG. 4(A), or through an OCA tape (an example of an adhesive agent) 24 as in a laminate 22b illustrated in FIG. 4(B). Incidentally, considering the parallelism of the adjacent protruding portions 21, it is preferable to place the synthetic resin 23 and the OCA (optical clear adhesive) tape 24 only on one (i.e., one surface) of the facing surfaces located on the upper side and the lower side of each of the transparent plate materials 20, but they may be placed on the both sides.

The synthetic resin 23 and the OCA tape 24 are placed on the transparent plate materials 20 forming the laminate 22a and the laminate 22b, respectively, within the laminating area of each of the transparent plate materials 20 excluding both side end parts in the width direction of the laminating area. Since the synthetic resin 23 is in a liquid state, it is impossible to place it to the whole area mentioned above as illustrated in FIG. 4(A). While, since the OCA tape is an optical adhesive tape in a film state, it can be placed to the whole area mentioned above as illustrated in FIG. 4(B). Incidentally, the OCA tape has a thickness of, for example, approximately 10 to 300 μm (preferably, the lower limit is 50 μm and the upper limit is 150 μm; approximately 100 μm in this embodiment), and is a transparent tape consisting of a silicone resin, an acrylic resin, a polyurethane resin, or the like.

By the aforementioned method, a plurality of the protruding portions 21 each having the same protruding length h can be formed on the both sides of the laminate 22 in the width direction. However, by using a method for producing a light control panel according to another embodiment of the present invention illustrated in FIG. 5, a laminate 25 can also be formed.

Figure 5:
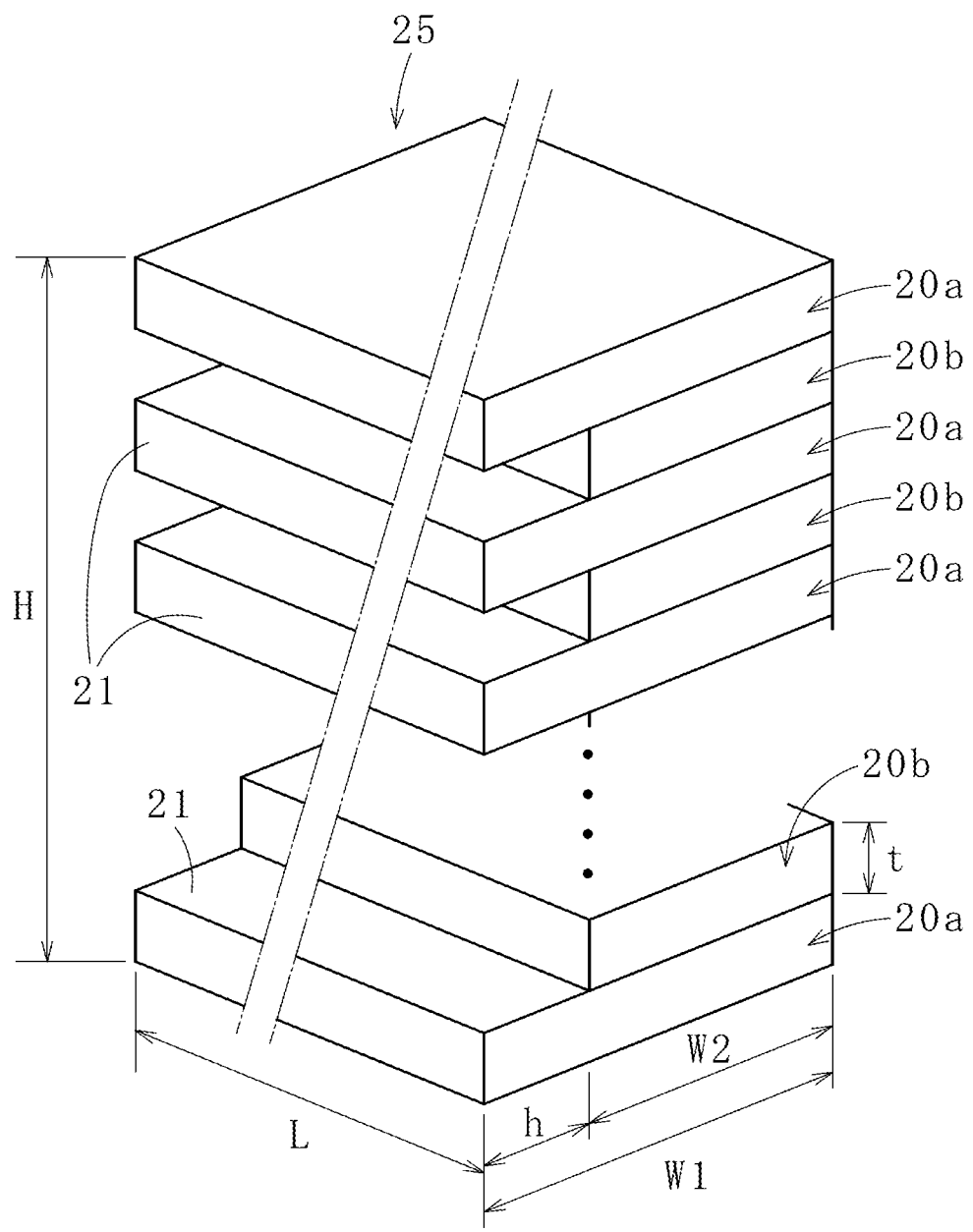
FIG. 5 is an explanatory drawing of a laminate formation step in a method for producing a light control panel according to another embodiment of the present invention.

As illustrated in FIG. 5, two types of transparent plate materials, that is, first transparent plate materials 20a and second transparent plate materials 20b, which have a same thickness and different widths, each consist of glass having a right-angled quadrilateral shape with short width and long length when viewed from above, are plurally prepared each, and the first and second transparent plate materials 20a and 20b are alternately laminated with edges of the first and second transparent plate materials 20a and 20b aligned on one side in a width direction of the laminate 25 to be formed and with protruding portions 21 formed on the other side in the width direction, thereby forming the laminate 25.

The dimensions of each first transparent plate material 20a are the same as those of each transparent plate material 20 mentioned above, and the dimensions of each second transparent plate material 20b are only different in width from the first transparent plate material 20a. The width W2 of each second transparent plate material 20b is narrower in the range of, for example, 0.2 to 10 mm than the width W1 of each first transparent plate material 20a depending on the protruding length of each of the protruding portions 21 to be formed.

Similar to the aforementioned laminate 22, a physical pressing force is applied to this laminate 25 in the laminating direction. However, the first and second transparent plate materials 20a and 20b disposed alternately may be joined together through the aforementioned synthetic resin 23 or OCA tape 24.

(The Light-Reflecting Layer Formation Step)

As illustrated in FIG. 2(B), the light-reflecting layers 13 are formed at least on the facing surfaces 16 of the adjacent protruding portions 21 (that correspond to the facing surfaces 16 of the glass materials 14).

Each light-reflecting layer 13 is composed of a metallic film (e.g., a vapor-deposition film or a metal plating film), the metallic film is formed by using a metal with a high reflection rate (e.g., Al [aluminum], Ag [silver], Ni [nickel], Ti [titanium], Cr [chromium], or the like), and the surface of the metallic film serves as the light-reflecting surface (i.e., reflective metallic surface) 17.

Although the thickness of each light-reflecting layer 13 (i.e., each metallic film) is, for example, 60 nm or more, preferably 80 nm or more (e.g., approximately 100 nm; the upper limit is approximately 150 nm), the thickness is not limited by these numerical values.

For forming the light-reflecting layers 13, irradiation or plating may be used.

The irradiation can be carried out by metal-spraying from an oblique direction with respect to each of the facing surfaces 16, and the metal-spraying includes sputtering, metal vapor deposition, micro-metal-particle spraying, ion beaming, or the like. Since the irradiation is performed by spraying a metal to (i.e., by irradiating with the metal at) the opposite surfaces 16 from an oblique direction (i.e., from a specific direction), the surface on one side of each transparent plate material 20 (i.e., each protruding portion 21) and the top surface of it are to be covered by the metal.

Therefore, although the irradiation is needed to be performed on the laminate 22 four times or so, it is more economical comparing to the case of forming the metallic films to the entire surfaces of the both sides of each transparent plate material 20 in advance.

(The Resin Filling Step)

As illustrated in FIG. 2(B), the gap regions 26 between the adjacent protruding portions 21 on which the light-reflecting layers 13 are formed are filled with a transparent resin 27 and the transparent resin 27 is hardened (the hardened transparent resin 27 becomes the aforementioned transparent resin plate materials 15).

The refractive index η2 of the transparent resin 27 is the same as or substantially equal to the refractive index η1 of the transparent plate material 20 (e.g., the ratio between the refractive indexes η1 and η2 of the transparent plate material 20 and the transparent resin 27 is 0.9 to 1.1).

Note that it is preferred that filling the gap regions 26 with the transparent resin 27 be conducted under a deaerated condition after transparent thin plates consisting of glass or resin are placed onto the both side faces (i.e., the both end surfaces in the longitudinal direction) of the transparent plate materials 20. The thin plates can be removed after the transparent resin 27 is hardened.

Since the laminate 22 has the plurality of protruding portions 21 at each of the both sides thereof in the width direction, the aforementioned light-reflecting layer formation step and resin filling step are performed on the protruding portions 21 at each of the both sides. For example, after forming the light-reflecting layers 13 (i.e., the light-reflecting layer formation step) at both sides of the laminate 22, pouring and hardening the transparent resin 26 (i.e., the resin filling step) is performed at each side of the laminate 22. Alternatively, forming light-reflective layers 13 (i.e., the light-reflecting layer formation step), and pouring and hardening the transparent resin 26 (i.e., the resin filling step) may be carried out in sequence at each side of the laminate 22. Therefore, the paired first and second light control panels 10 and 11 can be produced at once from the one laminate 22.

Figure 6:
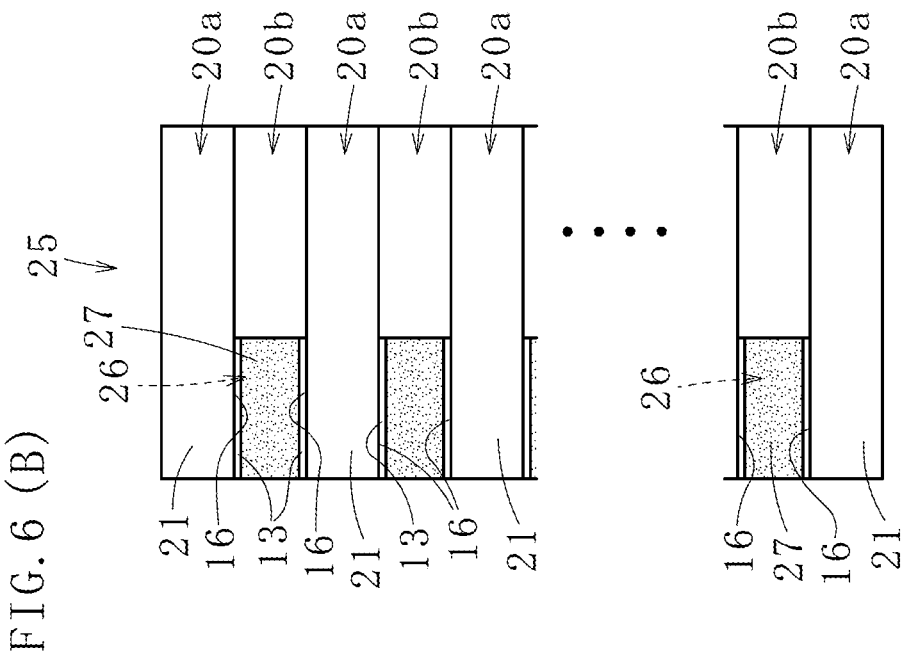
FIGS. 6(A) and 6(B) are a side view and a front view of a laminate having undergone a resin filling step in the same method for producing a light control panel, respectively.
Figure 6:
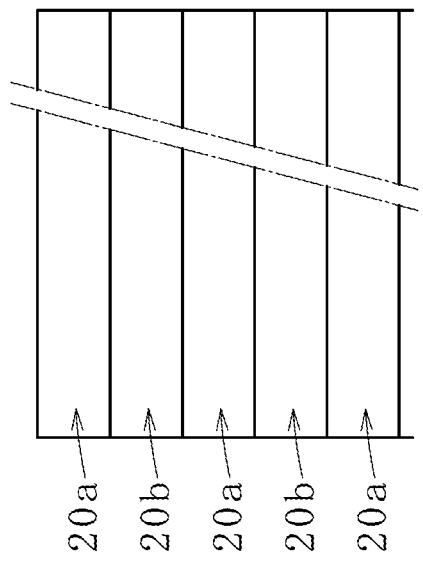

On the other hand, in the laminate 25, the plurality of protruding portions 21 are formed only at the other side in the width direction as illustrated in FIGS. 6(A) and 6(B), and thus, the aforementioned light-reflecting layer formation step and resin filling step are conducted in sequence to the protruding portions 21 at the other side. Therefore, by using two of the laminated bodies 25, the first and second light control panels 10 and 11 can be produced at once and the producing time can be shortened.

(The Cutting Step)

The protruding portions 21, which are integrated at each of both sides of the laminate 22 by filling the gap regions 26 with the transparent resin 27, are cut off and separated from a laminated body 28 (i.e., the laminate 22 excluding the protruding portions 21) illustrated in FIG. 2(B), and preforms 29 and 30 for the paired first and second light control panels 10 and 11, respectively, are made. In the case of the laminate 25, only the other side in the width direction where the protruding portions 21 are integrated by being filled with the transparent resin 27 is cut off.

The cutting of the protruding portions 21 is needed to be done to the spot where the protruding portions 21 and the transparent resin 27 are alternately disposed (in other words, the position where the transparent plate materials 20 located between the adjacent transparent plate materials 20 forming the protruding portions 21 are not cut [i.e., the root-end positions of the protruding portions 21]).

However, in the laminate formation step mentioned above, there are cases where the positions of the tip surfaces of the protruding portions vary when seen along the laminating direction of the transparent plate materials (i.e., cases where the tip surfaces of the protruding portions are not flush with one another). Furthermore, in the resin filling step mentioned above, there are cases where the positions of exposed surfaces (i.e., tip surfaces) of the transparent resin hardened within the gap regions between the adjacent protruding portions vary when seen along the laminating direction of the transparent plate materials or deviate from the positions of the tip surfaces of the protruding portions. In addition, in the light-reflecting layer formation step mentioned above, there are cases where the thickness of the metallic film formed on the protruding portion gets thinner toward the root-end of the protruding portion (i.e., gradations occur easily).

Figure 7:
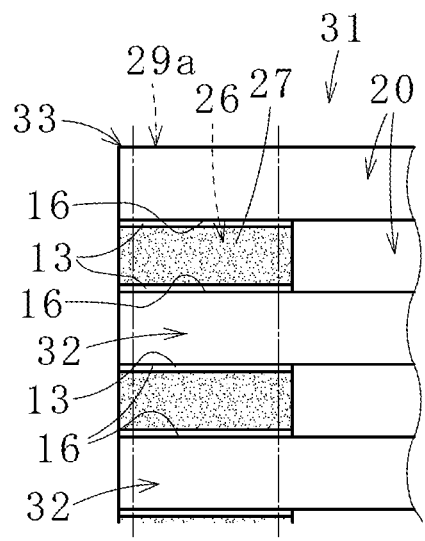
FIGS. 7(A) and 7(B) are an explanatory drawing of a cutting step according to a third modification and an explanatory drawing of a cutting step according to a fourth modification, respectively.
Figure 7:
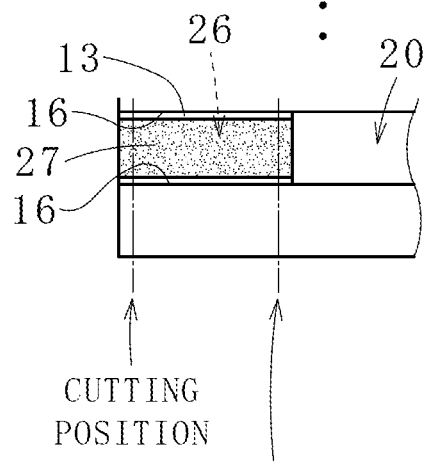
Figure 7:
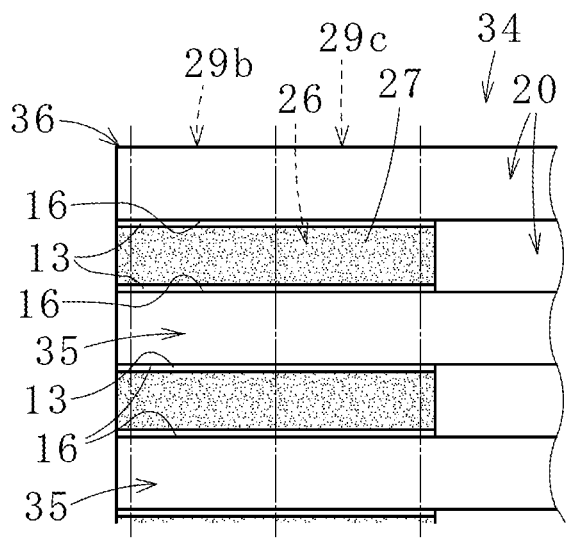
Figure 7:
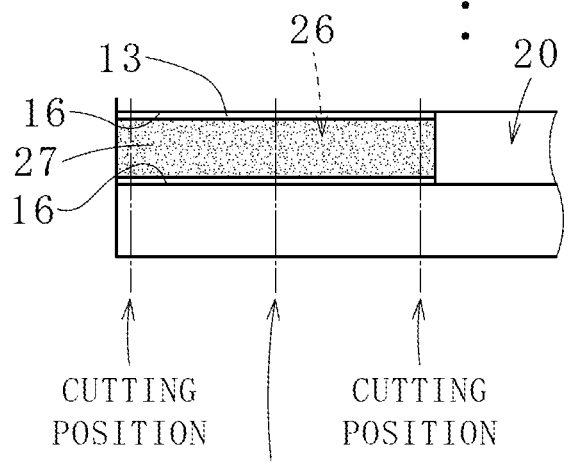

In order to deal with these problems, as in a laminate 31 illustrated in FIG. 7(A), in the laminate formation step, a plurality of transparent plate materials 20 are laminated so that protruding portions 32 each having a long protruding length can be formed, and the aforementioned light-reflecting layer formation step and resin filling step are sequentially performed. Then, in the cutting step, first, the tips 33 of the protruding portions 32 integrated by being filled with the transparent resin 27 (the tips of the transparent resins 27 are also included) are cut off so that the tip positions of the remaining protruding portions 32 (the tip positions of the remaining transparent resins 27 are also included) are flush with one another. Subsequently, the remaining protruding portions 32 are cut off at positions that avoid the portions where the thickness of each of the metallic films becomes thin (i.e., at positions ahead of the root-end positions of the protruding portions 32), thereby making a preform 29a (the same applies to the protruding portions 32 at the other side of the laminate 31).

In FIGS. 2(A), 2(B), and 7(A), a case where one preform for the light control panel is made from one side in the width direction of each of the laminates 22 and 31 has been described. However, as illustrated in FIG. 7(B), it is also possible to make a plural number (two in here; three or more are acceptable) of the preforms for the light control panels from one side in the width direction of a laminate 34.

Specifically, as in a laminate 34 illustrated in FIG. 7(B), in the laminate formation step, a plurality of transparent plate materials 20 are laminated so that protruding portions 35 each having a protruding length even longer than the protruding portions 32 mentioned above can be formed, and the aforementioned light-reflecting layer formation step and resin filling step are sequentially performed. Then, in the cutting step, first, the tips 36 of the protruding portions 35 integrated by being filled with the transparent resin 27 (the tips of the transparent resins 27 are also included) are cut off so that the tip positions of the remaining protruding portions 35 (the tip positions of the remaining transparent resins 27 are also included) are flush with one another. Subsequently, a plurality of preforms 29b and 29c are sequentially cut off from the tip-side to the root-side of the remaining protruding portions 35. The cutting of the preforms can be performed without cutting the tips of the protruding portions (the tips of the transparent resins are also included) as long as the positions of tip surfaces of the protruding portions and the positions of the exposed faces of the transparent resins are flush with one another along the laminating direction of the transparent plate materials.

Note that even in the case of a laminate in which the protruding portions are formed only at the other side in the width direction as in the laminate 25 illustrated in FIG. 5, by using the same method as the above method, in the cutting step, one preform or a plurality of preforms can be made from the protruding portions the tips of which has been cut off so that the tip portions thereof are flush with one another, or one preform or a plurality of preforms can be made from the protruding portions without cutting off the tips.

(The Flattening Step)

The first and second light control panes 10 and 11 are produced by flattening the cut-out end surfaces and the exposed end surfaces on the opposite sides of the cut-out end surfaces (i.e., the both end surfaces in the width direction) of the preforms 29 and 30, respectively. The flattening treatment is carried out so that both the cut-out end surface and the exposed end surface become transparent and level.

For the flattening treatment, a polishing treatment using, for example, a polishing material in a paste state or a polishing material that disappears in response to chemicals may be adopted. However, the treatment to be adopted is not particularly limited as long as the both end surfaces of the preforms 29 and 30 in the width direction can be flattened,.

The above-mentioned polishing treatment may whiten the surfaces of the first and second light control panels 10 and 11 and adversely affect the product quality. In this case, a transparent thin cover plate consisting of glass or resin is attached onto each of the polished surfaces of the first and second light control panels 10 and 11 by using a transparent adhesive agent (same as the aforementioned adhesive agent used to join the first and second light control panels 10 and 11 together). This makes it possible to prevent the adverse effect and protect the first and second light control panels 10 and 11. This transparent thin cover plate can also be attached after performing the assembling step described later.

Incidentally, the same treatment may be applied to the preform(s) for the light control panel(s) made from the laminate 25 illustrated in FIG. 5.

(The Assembling Step)

After the first light control panel 10 is placed on, for example, a support, the aforementioned adhesive agent (a liquid [a jelly]) is put on the first light control panel 10, and the second light control panel 11 is disposed to be superposed on the first light control panel 10 in a manner where the light-reflecting layers 13 of the respective light control panels 10 and 11 are disposed to be orthogonal to each other in a plan view.

Then, under a deaerated condition (in a depressurized condition, moreover in a vacuum condition), the second light control panel 11 is pressurized to the first light control panel 10 by using a press machine and the first and second light control panels 10 and 11 are joined together. Joining the first and second light control panels 10 and 11 under a deaerated condition like this prevents air bubbles from occurring inside. Incidentally, by adding a vibration such as an ultrasonic wave to the first and second light control panels 10 and 11 (i.e., by vibrating them) while joining them, air bubbles generated inside can be removed.

As the adhesive agent, a plate-shaped (sheet-shaped) adhesive agent made from a thermoplastic resin may also be used.

In this case, first, the plate-shaped adhesive agent is placed on the first light control panel 10, and then the second light control panels 11 is placed on the adhesive agent. Subsequently, while pressing the second light control panel 11 to the first light control panel 10 by using a press machine under a deaerated condition, at least the adhesive agent is heated so as to be softened (moreover, be molten) and then cooled.

Alternatively, an adhesive agent may be injected between the first and second light control panels 10 and 11 which are superimposed and disposed to face each other under a deaerated condition. In this case, any openings other than the portion from which the adhesive agent is to be injected are sealed.

By the method described above, the optical image forming device 12 illustrated in FIGS. 3(A) and 3(B) is completed.

Incidentally, for producing a light control panel, it is also possible to use a transparent plate material, which has a light-reflecting layer or light-reflecting layers formed in advance on one side surface or both side surfaces (at least on parts to be the facing surfaces of the protruding portions adjacent to each other; the same applies to the following cases) thereof, instead of the aforementioned transparent plate material 20 (it is also possible to use the first and second transparent plate materials that are two types of transparent plate materials having different widths and each having a light-reflecting layer or light-reflecting layers formed on one side surface or both side surfaces thereof, instead of the first and second transparent plate materials 20a and 20b).

On the peripheral surface of the transparent plate material (i.e., on the surface except for the both front and back surfaces), no light-reflecting layer is formed (i.e., the peripheral surface of the transparent plate material is in a transparent state).

By sequentially performing the aforementioned laminate formation step, resin filling step, cutting step, flattening step, and assembling step using a plurality of the transparent plate materials, the optical image forming device can be produced.

The present invention has been described above with reference to the embodiments. However, the present invention is not limited to the configurations described in the above embodiments, and the present invention includes other embodiments and modifications conceivable within the scope of the matters described in the scope of the claims. For example, the cases of configuring a method for producing a light control panel used in an optical image forming device according to the present invention by combining part(s) of or all of each of the aforementioned embodiments and/or modifications are also included within the scope of rights of the present invention.

Although the cases where the transparent plate materials that form the first and second light control panels are consisting of glass are explained in the embodiments above, the transparent plate materials may also be made from a hard resin with a high transparency and a high melting point.

Industrial Applicability

According to the method for producing a light control panel used in an optical image forming device according to the present invention, the light control panel can be produced at a relatively low cost and the image formed by the optical image forming device has less distortion. The optical image forming device formed by using the light control panels can be effectively used in a device requiring images (for example, medical devices, home electric appliances, automobiles, aircrafts, vessels, etc.).

REFERENCE SIGNS LIST

10: first light control panel, 11: second light control panel, 12: optical image forming device, 13: light-reflecting layer, 14: glass plate material, 15: resin plate material, 16: facing surfaces, 17: light-reflecting surface, 20, 20a, 20b: transparent plate material, 21: protruding portion, 22, 22a, 22b: laminate, 23: synthetic resin (adhesive agent), 24: OCA tape (adhesive agent), 25: laminate, 26: gap region, 27: transparent resin, 28: laminated body, 29, 29a, 29b, 29c, 30: preform, 31: laminate, 32: protruding portion, 33: tip, 34: laminate, 35: protruding portion, 36: tip

The invention claimed is:

1. A method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

a laminate formation step of forming a laminate by laminating a plurality of transparent plate materials having a same thickness and consisting of glass or a hard resin with a high melting point while alternately shifting the transparent plate materials by a predetermined length in a width direction so as to form protruding portions;

a light-reflecting layer formation step of forming the light-reflecting layers at least on facing surfaces of the protruding portions adjacent to each other;

a resin filling step of filling gap regions between the protruding portions adjacent to each other with a transparent resin;

a cutting step of making a plurality of preforms for the light control panels by cutting the protruding portions having been integrated by being filled with the transparent resin at each of both sides of the laminate off and separating the integrated protruding portions from a laminated body; and a flattening step of flattening both end surfaces of each of the preforms in a width direction so as to produce the light control panels, wherein a ratio between refractive indexes of the transparent plate materials and the transparent resin is 0.9 to 1.1.

2. The method for producing a light control panel set forth in claim 1, wherein in the laminate formation step, the plurality of transparent plate materials are joined together through an adhesive agent.

3. The method for producing a light control panel set forth in claim 2, wherein the adhesive agent is an OCA tape.

4. A method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

a laminate formation step of forming a laminate by preparing a plurality of pieces each of two types of transparent plate materials having a same thickness and different widths, and each consisting of glass or a hard resin with a high melting point, and by laminating the two types of transparent plate materials alternately with edges of the transparent plate materials aligned on one side in a width direction of the laminate to be formed and with protruding portions formed on another side in the width direction;

a light-reflecting layer formation step of forming the light-reflecting layers at least on facing surfaces of the protruding portions adjacent to each other;

a resin filling step of filling gap regions between the protruding portions adjacent to each other with a transparent resin;

a cutting step of making a preform for the light control panel or a plurality of preforms for the light control panels by cutting the protruding portions having been integrated by being filled with the transparent resin off and separating the integrated protruding portions from a laminated body; and a flattening step of flattening both end surfaces of the preform or each of the preforms in a width direction so as to produce the light control panel or the light control panels, wherein a ratio between refractive indexes of the transparent plate materials and the transparent resin is 0.9 to 1.1.

5. The method for producing a light control panel set forth in claim 4, wherein in the laminate formation step, the plurality of transparent plate materials are joined together through an adhesive agent.

6. The method for producing a light control panel set forth in claim 5, wherein the adhesive agent is an OCA tape.

7. A method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

a laminate formation step of forming a laminate by laminating a plurality of transparent plate materials having a same thickness, consisting of glass or a hard resin with a high melting point and having the light-reflecting layers formed on an entire area or a partial area of the transparent plate material in advance while alternately shifting the transparent plate materials by a predetermined length in a width direction so as to form protruding portions;

a resin filling step of filling gap regions between the protruding portions adjacent to each other with a transparent resin;

a cutting step of making a plurality of preforms for the light control panels by cutting the protruding portions having been integrated by being filled with the transparent resin at each of both sides of the laminate off and separating the integrated protruding portions from a laminated body; and a flattening step of flattening both end surfaces of each of the preforms in a width direction so as to produce the light control panels, wherein the area for forming the light-reflecting layers in each of the transparent plate materials includes parts to be facing surfaces of the protruding portion, and a ratio between refractive indexes of the transparent plate materials and the transparent resin is 0.9 to 1.1.

8. The method for producing a light control panel set forth in claim 7, wherein in the laminate formation step, the plurality of transparent plate materials are joined together through an adhesive agent.

9. The method for producing a light control panel set forth in claim 8, wherein the adhesive agent is an OCA tape.

10. A method for producing a light control panel used in an optical image forming device, the light control panel having a number of light-reflecting layers arranged in parallel so as to be perpendicular to front and back surfaces of the light control panel, the optical image forming device being formed by disposing two of the light control panels to be superposed on each other so that the light-reflecting layers of the respective light control panels are orthogonal to each other in a plan view, the method for producing a light control panel comprising:

- a laminate formation step of forming a laminate by preparing a plurality of pieces each of two types of transparent plate materials having a same thickness and different widths, each consisting of glass or a hard resin with a high melting point, and each having the light-reflecting layers formed on an entire area or a partial area of the transparent plate material in advance, and by laminating the two types of transparent plate materials alternately with edges of the transparent plate materials aligned on one side in a width direction of the laminate to be formed and with protruding portions formed on another side in the width direction;
- a resin filling step of filling gap regions between the protruding portions adjacent to each other with a transparent resin;
- a cutting step of making a preform for the light control panel or a plurality of preforms for the light control panels by cutting the protruding portions having been integrated by being filled with the transparent resin off and separating the integrated protruding portions from a laminated body; and
- a flattening step of flattening both end surfaces of the preform or each of the preforms in a width direction so as to produce the light control panel or the light control panels, wherein the area for forming the light-reflecting layers in each of the transparent plate materials includes parts to be facing surfaces of the protruding portion, and a ratio between refractive indexes of the transparent plate materials and the transparent resin is 0.9 to 1.1.

11. The method for producing a light control panel set forth in claim 10, wherein in the laminate formation step, the plurality of transparent plate materials are joined together through an adhesive agent.

12. The method for producing a light control panel set forth in claim 11, wherein the adhesive agent is an OCA tape.

* * * * *